United States Patent [19]

Chaput

[11] 4,030,565

[45] June 21, 1977

[54] COLLAPSIBLE SAWHORSE PACKAGE

[76] Inventor: Reynald Chaput, 5140 Inwood Drive, Jackson, Mich. 39206

[22] Filed: Dec. 3, 1975

[21] Appl. No.: 637,412

[52] U.S. Cl. .................................. 182/151; 182/186

[51] Int. Cl.$^2$ .......................................... F16M 11/00

[58] Field of Search ........... 182/226, 186, 155, 151

[56] References Cited

UNITED STATES PATENTS

| | | | |
|---|---|---|---|
| 1,485,251 | 2/1924 | Davis | 182/226 |
| 2,816,805 | 12/1957 | Vaughn | 182/186 |
| 3,008,535 | 11/1961 | De Vries | 182/151 |
| 3,241,633 | 3/1966 | Bond et al. | 182/151 |

*Primary Examiner*—Reinaldo P. Machado

*Attorney, Agent, or Firm*—Cushman, Darby & Cushman

[57] ABSTRACT

An improved collapsible sawhorse package in which each pair of legs of the sawhorse are interleaved with the ridge board placed centrally therebetween. When formed into the package, the ridge board and one leg of the opposite pair of legs are positioned between the two legs of the other pair and within the ridge board gripping bracket mounted to that other pair. A securing pin extends through the package formed by the interleaved pairs of legs and the ridge board and is secured in place at each end by rods which extend through the ends of that securing pin. The rods are also used to maintain the pairs of legs open when the sawhorse is erected.

5 Claims, 5 Drawing Figures

COLLAPSIBLE SAWHORSE PACKAGE

This invention relates to carpenters' sawhorses and particularly to an improved collapsible sawhorse package which is easily carried, stored and used by carpenters.

Collapsible sawhorses have been known in the art, examples being shown in U.S. Pat. Nos. 3,379,282; 3,605,945; 3,282,379 and 3,793,916.

U.S. Pat. Nos. 3,379,282 and 3,605,945 disclose collapsible sawhorses in which the legs and ridge board are formed into a unitized package. In both instances, however, the top horizontal portion or ridge board forms the base of the package and supports each pair of legs after they have been folded together. In U.S. Pat. No. 3,379,282 each pair of legs is secured to the ridge board by means of dowel pins which are of a length sufficient to extend through at least one leg and into the other leg of the pair whereas in U.S. Pat. No. 3,605,945 a rotatable L-shaped fastener is used to secure the respective pairs of legs to the ridge board. In U.S. Pat. No. 3,379,282 there is no means for adequately securing the pairs of legs on the ridge board should the package be turned over, while the L-shaped fasteners used in U.S. Pat. No. 3,605,945 may securely hold the pairs of legs on the ridge board such fasteners may well become damaged by being bent or lost, thus making the formation of a secure package difficult or impossible to achieve. Likewise, the notches that are provided in the legs and which fit around the L-shaped fasteners may likewise become damaged, which presents additional problems in achieving a secure fit between the fasteners, the pairs of legs and the ridge board.

In the Jones U.S. Pat. No. 3,282,379 a collapsible sawhorse is disclosed in which each pair of legs is affixed to the ridge board by means of a hinged gripping device. When forming the elements of the sawhorse into a package the legs are initially folded towards each other and then rotated on the hinge toward the bottom center of the ridge board. However, because the legs remain attached to the ridge board, the package which is created is not considered from a practical standpoint to be very compact. In addition, should the hinge become damaged, the ability to form the sawhorse into a package becomes impaired.

Woods U.S. Pat. No. 2,793,916 shows a simpler sawhorse structure than is shown in the patents referred to above but again does not show a compact sawhorse package as is set forth in the following specification and does not disclose the novel method of producing an efficient compact package as does the present invention.

The collapsible sawhorse package as set forth herein is comprised of a ridge board and two pairs of legs. Each pair of legs is mounted within gripping brackets which when erected and when the respective pairs of legs are open will serve to effectively grip and securely hold the ridge board during use. In forming the compact sawhorse package, a rod, used to maintain each of the pairs of legs open, is removed allowing the legs to be freely foldable toward each other. This will remove the gripping brackets from the ridge board which can be placed on the ground on a side edge. Thereafter, one leg from each pair of legs is interleaved about the ridge board which will be centrally located in the finished package so that one leg from one pair and the ridge board lie between the adjacent legs of the other pair.

The ridge board and the two pairs of legs are then moved toward each other until the ridge board and each leg of the opposite pairs of legs extend within the respective gripping brackets of each pair. When the pairs of legs and ridge board are in this position, holes which have been provided in each leg and the ridge board will be in alignment allowing a pin to be passed therethrough with the rods, formerly used to hold each pair of legs open, now serving to retain the pin in place by passing the rods through holes provided in the ends of the pin exteriorly of the package. Additionally, the rods can be slightly bent so as to cause them to act like springs to more securely hold the pin within the aligned holes. To accomplish this, rod supports are provided on each outer leg of the package so as to maintain the rod in a bent or tensioned condition. With the ridge board and one end of each pair of legs positioned within the opposite legs gripping head and with the pin in its securing position, the package is securely held together. In addition, a handle may be provided on the ridge board so as to facilitate the further handling of the package.

These details of this compact package will become quite clear upon reading the following specification in conjunction with the accompanying drawings wherein FIG. 1 shows a perspective view of the sawhorse in erected condition;

Figure 1:
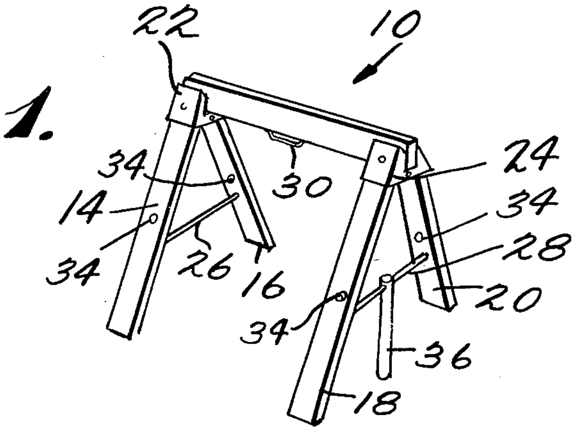

Turning first to FIG. 1, the sawhorse, generally indicated at 10, is shown in an erected condition. A ridge board 12 is shown as being supported by legs 14, 16, 18 and 20. The legs 14 and 16 are held together at the end adjacent the ridge board by means of a gripping bracket 22 which allows the legs to be pivotable one with respect to the other. Likewise, legs 18 and 20 are held together in a pivotal relationship by means of a gripping bracket 24. When the sawhorse 10 is erected, as shown in FIG. 1, the legs 14 and 16 are held in an open condition by means of a rod 26 and likewise legs 18 and 20 are maintained in an open condition by means of rod 28. The rods 26 and 28 are preferably rods having a circular cross- section made of a mild steel or any other material such as a high strength plastic or resin. The rods 26 and 28 are also provided with pointed or sharpened ends with the angle of the sloping sides of the pointed end being approximately 60 degrees. It should be understood, however, that other cross-sectional shapes for rods 26 and 28 could be employed so long as the rod was bendable and capable of being provided with pointed or sharpened ends.

In erecting the sawhorse 10, the ridge board would be placed on the ground so that the handle 30 was pointing up and each pair of legs would be secured to the ridge board, preferably at the ends thereof, by placing the pairs of legs and their respective gripping brackets 22 and 24 on the ridge board 12 and thereafter spreading the legs apart so as to close brackets 22 and 24 around ridge board 12. The rods 26 and 28 would then be pushed between the legs until the rod was under suitable compression such that the pointed ends of the rods pierced the legs of the pair. Thus, notwithstanding the width of ridge board 12 nor the amount of use to which the sawhorse is placed, the opening of the brackets 22 and 24 will be fully adjustable by means of the compressive force of rods 26 and 28 acting upon their respective pairs of legs. Preferably, the ridge board and the legs are constructed of wooden two-by-fours, but it should be understood that other materials could likewise be used so long as the rods 26 and 28 would be able to pierce the leg material. Further, the ridge board 12 and legs 14, 16, 18 and 20 are all of equal length with the preferred lengths being 24 inches or 32 inches.

Figure 2:
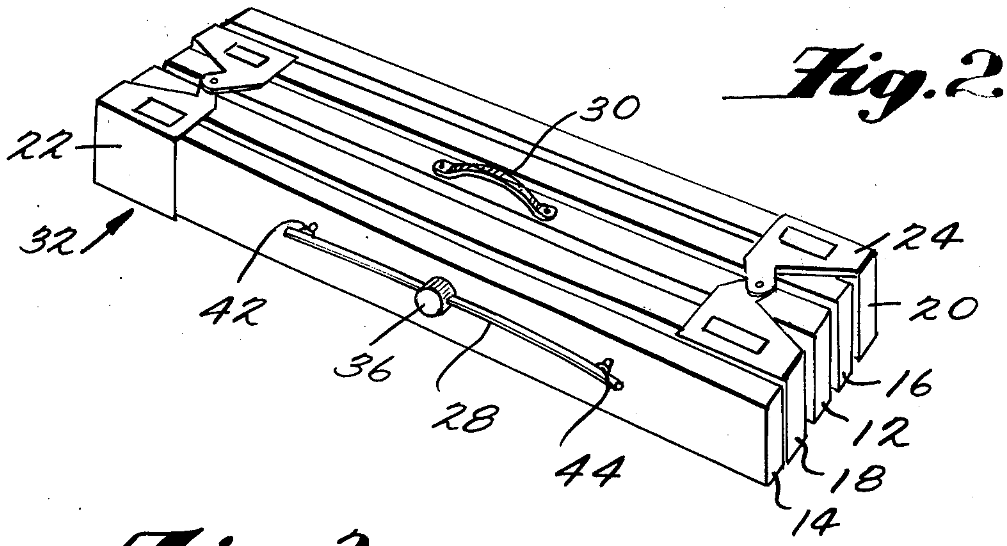
FIG. 2 shows a perspective view of the package.
Figure 3:
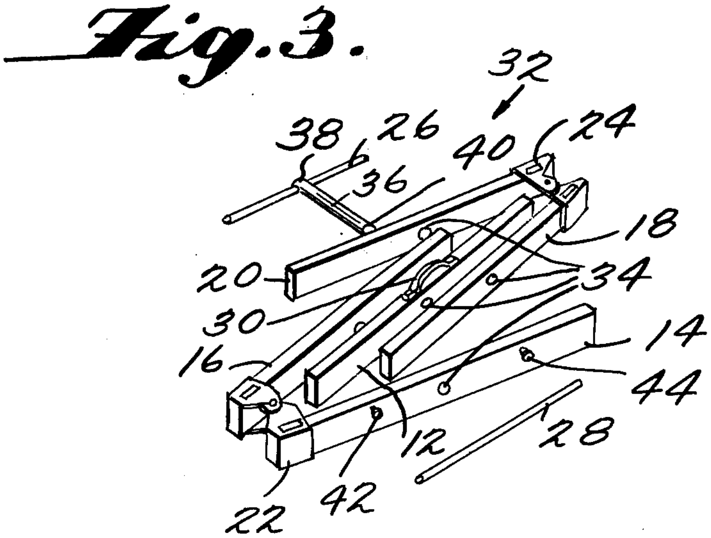
FIG. 3 shows a perspective exploded view of the package.

The compact package into which the sawhorse can be formed is generally indicated at 32 in FIGS. 2 and 3. In order to dismantle the sawhorse 10, the sawhorse 10 is inverted and the rods 26 and 28, which are under compression but bendable, can be easily removed allowing the respective pairs of legs 14 and 16, 18 and 20 to be pivoted toward each other so as to remove the effects of the gripping brackets 22 and 24 from the ridge board 12. The pairs of legs, as best shown in FIG. 3, are then placed on the ground and partially folded together and interleaved around the ridge board 12. As shown in FIG. 2, the gripping bracket is dimensioned so that the one end of ridge board 12 and the free end of one leg of the opposite pair of legs will fit within the gripping bracket in between the pairs of legs which are mounted in that gripping bracket. When the legs are thus interleaved with the ridge board and respectively positioned within gripping brackets 22 and 24, holes 34 which are provided in the ridge board 12 and the legs 14, 16, 18 nad 20 will be aligned allowing a pin 36 to be positioned therein. Preferably, the holes 34 will be centrally located but it should be understood that other arrangements could work equally as well. The pin 36 is provided at each end with holes 38 and 40, respectively, which are dimensioned so as to allow the rods 26 and 28, respectively, to pass therethrough.

As shown in FIGS. 1, 2 and 3 of the legs of each pair will be positioned exteriorly of the gripping bracket mantel on the opposite pair. Rod support devices 42 and 44 are provided on each of those legs which, as shown in FIG. 2, serve to not only cause the rods 26 and 28 to be kept in a bent, spring-like condition, but also support the ends of the rods 26 and 28 and securely hold the rods 26 and 28 in place. The rod support devices 42 and 44 preferably are No. 8 ×1¼hexagon washer slotted screws not driven all the way as is shown in FIG. 3 but it should be understood that the shape of the support devices 42 and 44 should correspond to the shape of the rods 26 and 28.

When the pin 36 is in place and the rods 26 and 28 are likewise in place, the pin 36 will be held in place and along with the brackets 22 and 24 securely hold the elements together in the package 32. Pin 36 along with rods 26 and 28 will hold the legs 14, 16, 18 and 20 together and prevent any lateral separation of those elements, while the gripping heads 22 and 24 securely hold the ends of the ridge board 12, the ends of the pair of legs mounted therein and one free end of the opposite pair of legs so as to prevent any vertical movement of the elements. Thus, a package will have been formed which is easily assembled and disassembled, which is very compact, and which securely retains all of the members comprising the collapsible sawhorse in a rigid fashion. In addition, the handle 30 provided centrally along one edge of the ridge board provides a convenient means by which the handling of the completed package 32 is facilitated.

Figure 4:
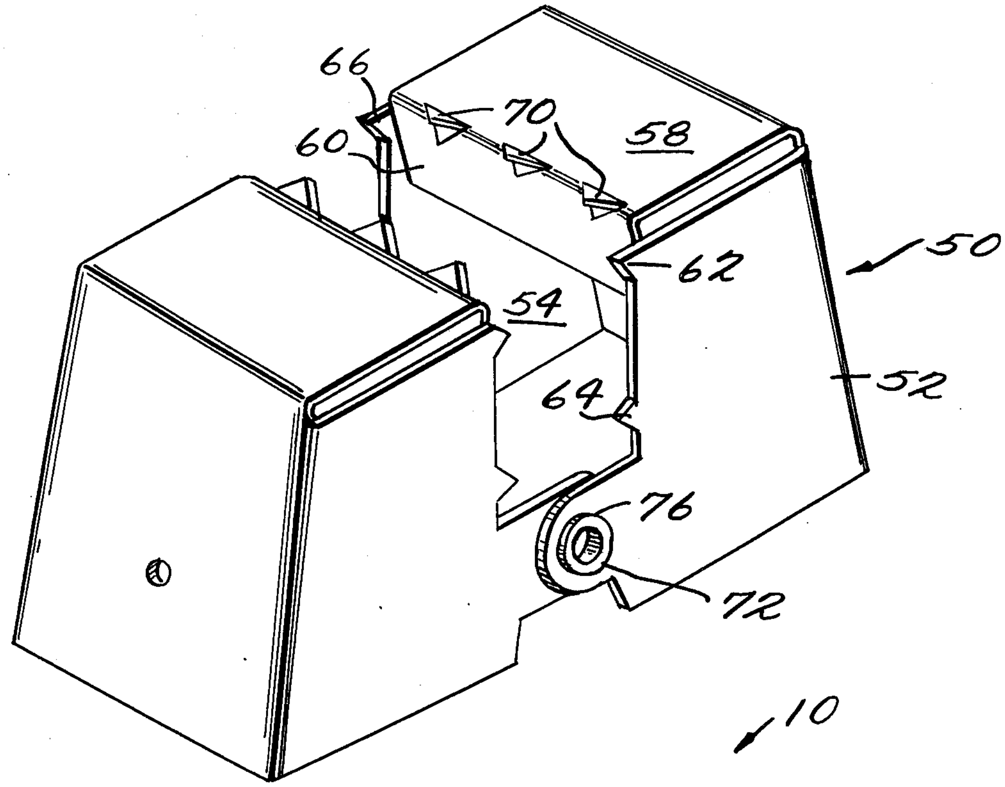
FIG. 4 shows a perspective view of the gripping bracket.
Figure 5:
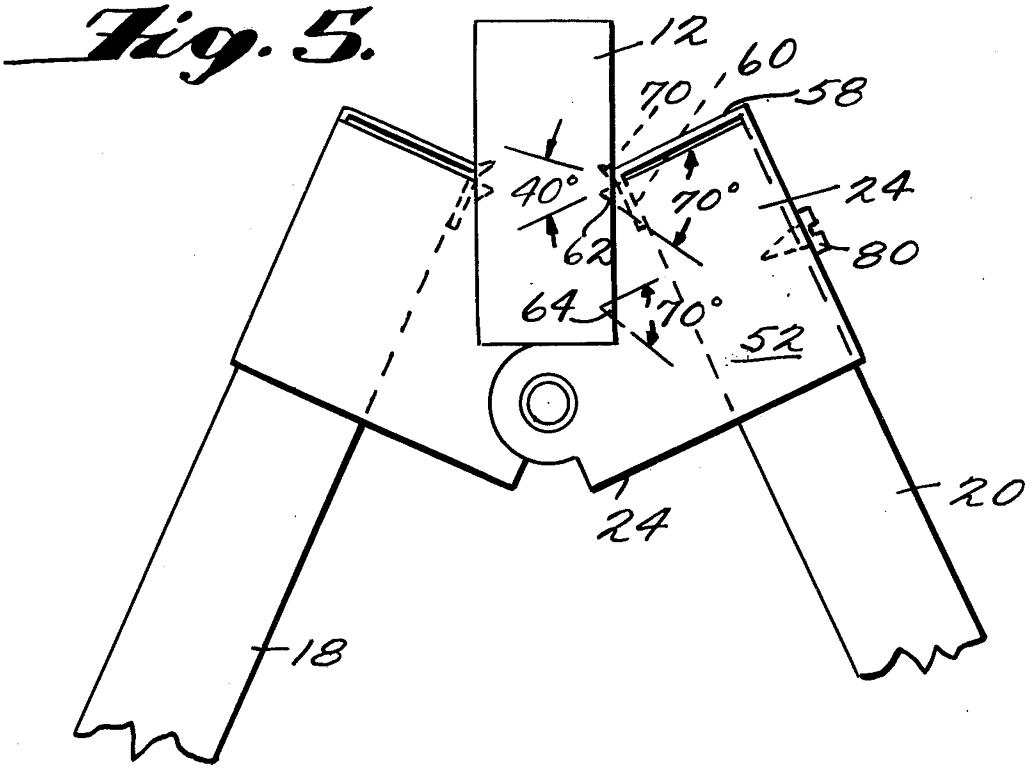
FIG. 5 shows an end view of the sawhorse taken along lines 5—5 of FIG. 1.

Turning now to FIG. 4, each gripping bracket is made up of two gripping members which are connected together in a pivotal relationship, one of which is shown in FIG. 4. Since each gripping members will be identical, it is felt that a description of one of the members will be sufficient to fully describe this invention to one skilled in the art. The gripping brackets 22 and 24 are preferably constructed of steel but it should be understood that other suitable materials such as a high impact plastic would be equally suitable. The gripping member, generally indicated at 50, is comprised of two sidewall portions 52 and 54, a front wall 56 and a top wall 58 which has a downwardly projecting lip portion 60. As shown in FIG. 5, each of the sidewalls 52 and 54 is provided with two pointed gripping projections 62 and 64, 66 and 68, respectively. While only two such projections are shown, however, a greater or lesser number could be employed. Likewise, the front lip 60 is provided with piercing projections 70. Each sidewall 52 and 54 is also provided with forward extending projections 72 and 74, respectively. The projection 72 is provided with an outwardly extending flange 76 while the projection 74 is provided with a circular opening generally indicated at 78. The opening 78 is proportioned so that the outwardly projecting flange 76 of the opposite gripping member will fit therein when two gripping head members are joined together with flange 76 of each member 50 providing a suitable means around which the gripping members 50 can rotate or pivot.

As shown in FIG. 5, the leg 20 fits within the gripping member 50 so that the downwardly projecting front lip 60 and the top wall 58 encapsulate the top end of leg 20 inserted therein. Thus, when the bottom of the legs comprising each pair of legs are rotated away from each other so that the gripping brackets 22 and 24 are closed and brought into contact with the ridge board 12, the top of each leg will tend to push against the front lip 60 so as to positively drive the members 50 causing the piercing projections 70 and the sidewall piercing projections, 62 and 64 as shown in FIG. 5, into the ridge board 12.

The projections 70 preferably are placed at an angle of approximately 40 ° from the horizontal plane established by the top of sidewall 52 whereas the sidewall piercing projections 62 and 64 are angled at approximately 70° from that same horizontal line. In addition, the applicant has found that while the legs will be suitably retained within the gripping means 22 and 24, the use of one screw as is indicated as 80 will effectively retain each of the legs within the gripping devices 22 and 24.

It will now be clear that there is provided herein a device which accomplishes the intended purpose of producing a very compact collapsible sawhorse package hereinbefore set forth. While the invention has been disclosed in a preferred form, it should be understood that the specific embodiment thereof as described and illustrated herein is not to be considered in a limited sense as there may well be other forms or modifications of the present invention which should also be constructed to come within the scope of the appended claims.

What is claimed is:

1. A collapsible sawhorse package comprising:

two pivotally movable gripping brackets each having a pair of legs mounted therein so that said legs are movable between open and closed positions, said pairs of legs being positioned oppositely from one another so that the legs within said pairs are positioned alternately on opposite sides of a centrally located ridge board, wherein each said gripping brackets holds one end of said centrally located ridge board and at least one leg of the opposite pair of legs, said ridge board and each of said legs is provided with at least one opening extending therethrough, wherein each opening is positioned along said ridge board and said legs respectively so that when said ridge board and said legs are formed into said package the openings are aligned and securing means for maintaining said package in a rigid condition, said securing means includes a pin, said pin having a length sufficient to allow the pin to at least pass through the aligned openings in the package formed from said ridge board and said legs and holding means for holding said pin within said aligned openings so as to secure said ridge board and said legs together.

2. A collapsible sawhorse package as claimed in claim 1, wherein said pin is of a length sufficient to allow the ends of said pin to extend beyond said package, wherein each of said ends of said pin is provided with an opening extending through said pin and wherein said holding means comprises spring means acting in cooperation with the openings in said pin for retaining said pin within said aligned openings.

3. A collapsible sawhorse package as claimed in Claim 2, wherein said spring means comprises a pair of rods one of which extends through each opening in said pin on opposite sides of said package and rod support means for supporting said rod in a bent condition.

4. A collapsible sawhorse package as claimed in Claim 1, wherein said gripping brackets are comprised of two pivotally attached bracket members each comprising a front, a top and two sidewalls, said top having a downwardly projecting lip whereby said top wall and said lip serve to encapsulate the top of the leg mounted therein, said lip and said sidewalls each having piercing projections extending outwardly therefrom so as to pierce said ridge board when said ridge board is placed within said gripping bracket and said legs are moved into an open position, and pivot means for holding said bracket members together in a pivotal relationship.

5. A collapsible sawhorse package as claimed in Claim 1, wherein said ridge board and said legs are of equal lengths.

* * * * *